United States Patent [19]
Quick et al.

[11] Patent Number: 4,595,611
[45] Date of Patent: Jun. 17, 1986

[54] INK-PRINTED OVENABLE FOOD CONTAINERS

[75] Inventors: James R. Quick, Warwick, N.Y.; Craig A. Golden, Columbus, Ohio; James W. Mitchell, Newburgh, N.Y.

[73] Assignee: International Paper Company, New York, N.Y.

[21] Appl. No.: 749,141

[22] Filed: Jun. 26, 1985

[51] Int. Cl.$^4$ .......... B65D 5/00; D21H 1/22; B32B 23/08
[52] U.S. Cl. .......... 428/35; 428/481; 427/258; 427/288; 427/391; 427/411; 426/127; 220/458; 229/3.5 R
[58] Field of Search .......... 428/35, 481; 427/258, 427/288, 391, 411; 426/127, 113; 229/3.5 R; 220/458

[56] References Cited

U.S. PATENT DOCUMENTS

| | | | |
|---|---|---|---|
| 3,967,998 | 7/1976 | Kane | 428/481 |
| 4,147,836 | 4/1979 | Middleton et al. | 428/481 |
| 4,265,969 | 5/1981 | Yasuda et al. | 427/411 |
| 4,327,136 | 4/1982 | Thompson et al. | 428/35 |
| 4,343,858 | 8/1982 | Thompson | 428/483 |
| 4,391,833 | 7/1983 | Self et al. | 428/481 |
| 4,421,825 | 12/1983 | Seiter | 427/411 |
| 4,543,280 | 9/1985 | Fujita et al. | 428/35 |

FOREIGN PATENT DOCUMENTS 0046198 3/1983 Japan .................. 427/411

Primary Examiner—John E. Kittle
Assistant Examiner—James J. Seidleck
Attorney, Agent, or Firm—Richard J. Ancel

[57] ABSTRACT

An ink-printed ovenable food container is prepared by
(a) printing a layer of paperboard with an ink containing a sulfonated polyester pigment binder,
(b) coating the resultant ink-printed paperboard with an unpigmented composition containing a sulfonated polyester,
(c) coating the resultant ink-printed and sulfonated polyester coated paperboard with a polyester resin sealing coating, and
(d) forming the resultant polyester resin sealed paperboard into a container.

30 Claims, 3 Drawing Figures

INK-PRINTED OVENABLE FOOD CONTAINERS

BACKGROUND OF THE INVENTION

This invention relates to ovenable food containers and more particularly to such containers having a design or graphics ink-printed thereon.

Containers have been developed for the packaging of food, which can also be used to reheat or cook the packaged food in a conventional or microwave oven when the food is to be eaten. Convenience foods may be partially processed or entire meals precooked in containers or food trays made of aluminum, plastic or paperboard. As taught in U.S. Pat. Nos. 3,904,104, 3,924,013 and 3,967,998, containers made from paperboard are generally coated on one or both sides with a water impermeable sealing resin, typically a polyester or polyamide resin.

Food processors rely heavily on packaging esthetics for repeat sales of their products at the retail level. Accordingly, there is a need for a feasible way of applying good quality, durable ink-printed graphics to ovenable food containers, particularly food trays for packaging TV dinners.

Special problems arise when an ovenable food container is to be printed on the side which comes in contact with the food being packaged. Generally speaking, food-grade colors are weak, transparent, do not withstand heating, and are otherwise unsuitable. Prior art approaches have included incorporating a more durable pigment into the water-impermeable sealing layer, as in U.S. Pat. No. 4,343,858, or sandwiching the pigment between layers of polymer as in U.S. Pat. No. 4,327,136. Whatever approach is utilized, the pigment and other ingredients of the printing or coloring composition must be prevented from migrating or coming into contact with the food to be ingested.

Conventional inks inhibit the adhesion of the polyester sealing layer to paperboard. Thus, ink-printing of paperboard with conventional ink formulations followed by coating with polyethylene terephthalate, for example, does not give a satisfactory product when the printed and coated paperboard is formed into a container.

SUMMARY OF THE INVENTION

In one aspect, the present invention is a method for making an ink-printed ovenable food container which comprises:

(a) printing a layer of paperboard with an ink containing a sulfonated polyester pigment binder,
(b) coating the resultant ink-printed paperboard with an unpigmented composition containing a sulfonated polyester,
(c) coating the resultant ink-printed and sulfonated polyester coated paperboard with a polyester resin sealing coating, and
(d) forming the resultant polyester resin sealed paperboard into a container.

In another aspect, the present invention is a method for making ink-printed paperboard suitable for forming into an ovenable food container which comprises steps (a), (b) and (c) above.

The present invention also contemplates the ink-printed paperboartd and ovenable food container so prepared.

DETAILED DESCRIPTION

Figure 1:
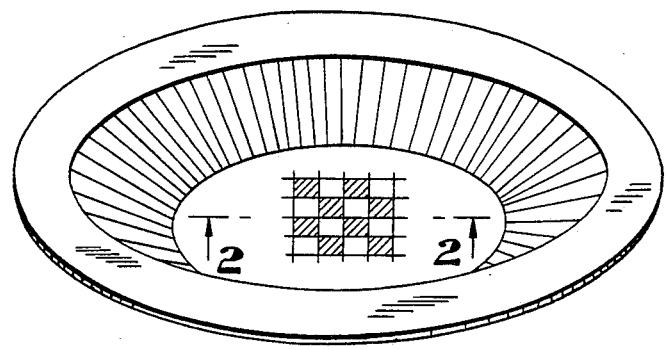
FIG. 1 is a perspective view of an ovenable food container embodiment according to the present invention.

The paperboard used in the practice of the present invention is conventional paperboard customarily utilized in the fabrication of ovenable food containers using standard techniques. White paperboard, resistant to browning when oven heated, such as is made from solid bleach sulfate or sulfite paper, is preferred. However, other types of paper stock may be used to prepare the paperboard. While the thickness of the paperboard layer is not critical, it should be sufficiently thick so that a container capable of holding food may be formed therefrom. The thickness utilized will depend somewhat on the size and shape of the container to be formed and the weight of the food to be contained therein. Thicknesses of 10–40 mils, preferably 15–25 mils or the minimum thickness required to form a container having the structural strength required.

One side of the paperboard (the inside or side to be in contact with the food being packaged) is optionally leveled by coating with a composition, generally an aqueous dispersion, containing a sulfonated polyester such as Eastman 8593 which is an aqueous dispersion of a sulfonated polyethylene terephthalate polyester resin supplied by Eastman Chemical Co. The sulfonated polyester resin used in Eastman 8593 has a molecular weight of approximately 14,000, a hydroxyl number of 6.0, an acid number of less than 2, a glass transition temperature of 29° C. and an ionic density of 5.6. Superior printing results when the aqueous dispersion also contains pigments, preferably white, such as kaolin, rutile calcium carbonate and/or the like. While use of a pigment is also optional, its presence further smooths the surface of the paperboard being leveled and provides a sharper, contrasting background for the design or graphics to be printed. The aqueous dispersion should contain a cross-linking agent for cross-linking the sulfonated polyester. The cross-linking resin is usually an acid-catalyzed formaldehyde donor, for example, triazine resin, dimethylol-ethylene urea, hexamethoxymethyl melamine, or dimethyloldihydroxy ethylene urea. Desirably, melamine/formaldehyde or urea/formaldehyde resin will be used, of which the former is preferred. Commercially available formaldehyde donors suitable for use herein include Cymel 303 (hexamethylolmethyl melamine/formaldehyde) and Parez 613 (trimethylolmethyl melamine/formaldehyde), both sold by American Cyanamid. Also, as is conventional, a catalyst, such as citric acid, glycolic acid or oxalic acid, is included to catalyze the cross-linking reaction. The aqueous dispersion may contain other conventional additives such as low viscosity, fully hydrolyzed polyvinyl alcohol.

The paperboard is printed once or several times, depending on the design and colors used, preferably using a flexographic or rotogravure printing procedure. As noted above, the paperboard may be optionally leveled with a sulfonated linear polyester prior to printing. When such leveling treatment is utilized, superior results are obtained when the leveling coating is only partially dry when the printing ink is applied. Printing is with an ink or inks containing a sulfonated polyester, preferably the same one as was used in the optional leveling treatment, as the pigment binder. While the ink composition does not have to be approved for food use, it should not contain obviously toxic materials such as lead-containing pigments or the like. Representative pigments suitable for use in conjunction with sulfonated polyester in practicing the present invention are titanium dioxide, iron oxide pigments, carbon black, and organic pigments such as isoindoline yellow.

The ink-printed paperboard is coated with a clear unpigmented composition containing sulfonated polyester resin, preferably the same resin used as the binder for the pigment in the ink-printing step. Superior results are obtained when the aforesaid composition is applied before the ink coating has completely dried. As discussed above, the sulfonated polyester composition, also contains a cross-linking agent and catalyst, and may contain other conventional additives such as polyvinyl alcohol. The sulfonated polyester resin in the ink coating and subsequent coating serves as a primer or the layer to promote adhesion to the outer layer of sealing resin.

The ink-printed and sulfonated polyester resin coated paperboard, is coated with a polyester ester sealing resin using standard procedures, preferably that described in U.S. Pat. No. 4,391,833. Maximum adhesion results when the printed paperboard is flame treated prior to extrusion coating with polyester sealing resin and quick chilled after extrusion coating.

The polyester resin sealed paperboard laminate is stamped by conventional means, such as described in U.S. Pat. No. 4,026,458, into shaped containers.

FIG. 1 shows the interior or food containing surface of a food container ink-printed according to the present invention. In this embodiment, the optional leveling treatment or initial coating step is omitted.

Figure 2:
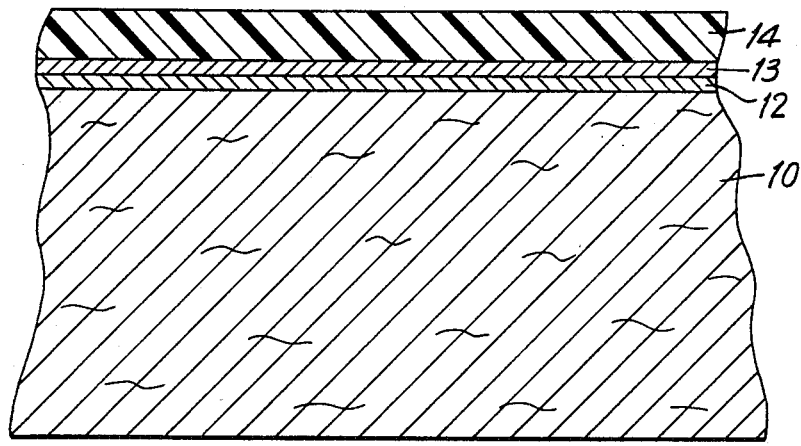
FIG. 2 is a cross-sectional view through line 2—2 of FIG. 1.

Referring to FIG. 2, the paperboard layer 10 bears a thin layer of pigment and sulfonated polyyester forming a design 12 on its food-side surface. The design layer is covered with an unpigmented layer 13 also containing sulfonated polyester. In addition to its other sealing functions, the outer layer 14 of polyethylene terephthalate prevents the ink composition from coming in contact with the food to be packaged and later heated in the container.

Figure 3:
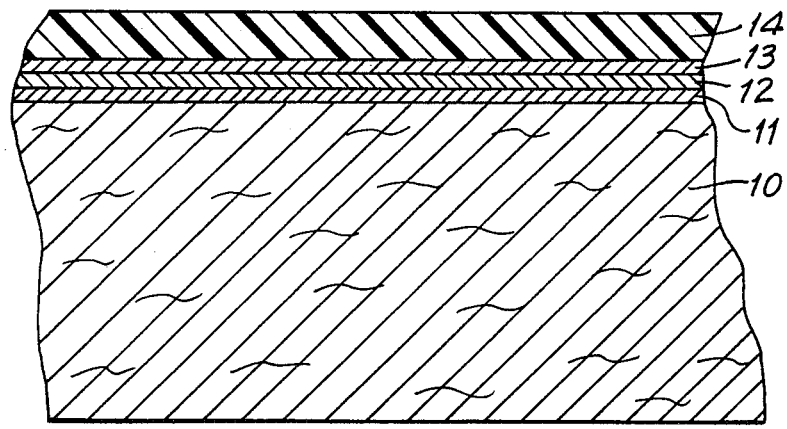
FIG. 3 is a cross-sectional view of another embodiment according to the invention.

In the embodiment illustrated in FIG. 3, a layer 11 containing sulfonated polyester is provided between the paperboard layer 10 and design layer 12. As noted previously, the layer 11 is optional and may optionally include a pigment which also serves as a leveling agent. As in the embodiment illustrated in FIGS. 1 and 2, the design layer 12 is covered with a pigmented layer 13 containing sulfonated polyester and then with an outer sealing layer 14 of polyethylene terephthalate.

The invention is further illustrated by means of the following non-limiting examples:

In preliminary laboratory trials, when paperboard was printed with conventional ink formulations and then extrusion coated with polyethylene terephthalate, the polyethylene terephthalate layer could be readily peeled or separated from the paperboard substrate. Use of a sulfonated polyester resin as the binding agent for the ink pigment and/or coating with a composition containing sulfonated polyester resin, prior to extrusion coating with polyethylene terephthalate, increased adhesion of the terephthalate coating to the paperboard substrate.

Larger ink-printed paperboard samples were prepared for extrusion coating with polyethylene terephthalate in trials simulating actual manufacturing conditions. The terephthalate coated samples were stamped into containers and evaluated. The paperboard samples were ink-printed as follows:

Sample 1. Paperboard was printed with an ink supplied by a commercial ink supplier, Sinclair and Valentine Co. This was a Pantone #468 tan ink modified with an acrylic resin to provide improved adhesion of a polyester extrusion coating. A coating of a clear (unpigmented) aqueous dispersion of a sulfonated polyester resin was applied over the printed surface.

Sample 2. Paperboard was printed with the same ink as in Sample 1. No coating was applied over the ink.

Sample 3. Paperboard was printed with a Pantone #468 tan ink containing a sulfonated polyester resin as a binder. A coating of a clear (unpigmented) aqueous dispersion of a sulfonated polyester resin was applied over the printed surface.

Sample 4. Paperboard was printed with an ink supplied by a commercial ink supplier, Sinclair and Valentine Co. This was a Pantone #129 yellow ink modified with an acrylic resin to improve the adhesion of a polyester extrusion coating. A coating of a clear (unpigmented) aqueous dispersion of a sulfonated polyester resin was applied over the printed surface.

Sample 5. Paperboard was printed with the same ink as in Sample 4. No coating was applied over the ink.

Sample 6. Paperboard was printed with a Pantone #129 yellow ink containing a sulfonated polyester resin as a binder. A coating of a clear (unpigmented) aqueous dispersion of a sulfonated polyester resin was applied over the printed surface.

Sample 7. Paperboard was printed with the same ink as in Sample 6. No coating was applied over the ink.

The aqueous dispersion used in the preparation of Samples 1, 3, 4 and 6 had the following formulation:

| | |
|---|---|
| sulfonated polyester resin dispersion (Eastman 8593) | 60.0 |
| melamine-formaldehyde resin (Cymel 303) | 6.0 |
| citric acid | 0.3 |
| 12 of polyvinyl alcohol (Vinol 107) | 33.7 |
| | 100.0 lbs. |

The Pantone #129 Yellow and Pantone #468 Tan inks used in Sample 3 and Samples 6 and 7, respectively, had the following formulations:

| | #129Y | #468T |
|---|---|---|
| dispersion of sulfonated polyester resin (Eastman 8593) | 47.7 | 47.7 |
| melamine-formaldehyde resin (Cymel 303) | 4.5 | 4.5 |
| citric acid | 0.2 | 0.2 |
| 12% polyvinyl alcohol (Vinol 107) | 25.0 | 25.0 |
| isoindole yellow (WD 2466) | 6.2 | 0.0 |
| red oxide (WD 2624) | 0.4 | 0.20 |
| yellow oxide (WD 2432) | 4.1 | 1.38 |
| titanium dioxide (WD 2002) | 14.35 | 23.30 |
| tinting black (WD 2345) | 0.0 | 0.08 |
| anti-foam agent (Colloid 513) | 0.2 | 0.2 |
| | 102.65 lbs. | 102.56 lbs. |

The pH was adjusted to about 8.5 with ammonium hydroxide. Additional water may be added to adjust viscosity.

Before extrusion coating with an outer layer of polyethylene terephthalate resin, all of the Samples, 1 through 7, were provided with an additional coating of the clear aqueous dispersion of sulfonated polyester resin of the same formulation as already applied to Samples 1, 3, 4 and 6. Following this additional coating step, all Samples, 1 through 7, were extrusion coated with polyethylene terephthalate using the procedure essentially as described in U.S. Pat. No. 4,391,833 and then pressed into 3-compartment TV dinner trays using standard die stamping apparatus. The finished trays were evaluated according to the following three criteria:

(a) adhesion of the polyethylene terephthalate sealing layer to the paperboard substrate,
(b) presence of absence of delamination during tray formation, and
(c) ovenability of the tray.

None of the paperboard samples printed with conventional inks (Samples 1, 2, 4 and 5) demonstrated fiber-tearing adhesion of the polyethylene terephthalate coating to the paperboard substrate. Only those samples (Samples 3, 6 and 7) printed with ink containing a sulfonated polyester resin as the pigment binder demonstrated fiber-tearing adhesion.

Since the printing ink composition interferes with polyethylene terephthalate coating adhesion to paperboard, the weakest bonding is found at the ink-polyethylene terephthalate interface. During tray formation, those samples coated with conventional ink compositions (Samples 1, 2, 4 and 5) delaminated at that interface along the top of the interior ribs of the trays being formed. Those samples ink-printed with sulfonated polyester as pigment binder, as well as being primed with a clear sulfonated polyester composition according to the present invention (Samples 3, 6 and 7), did not delaminate.

The sample trays prepared as described above were heated in an electric oven for 20–30 minutes at various temperatures ranging from 410° to 470° F. Trays made from paperboard Samples 3, 6 and 7 did not delaminate and demonstrated acceptable ink color stability even at temperature conditions exceeding those to be encountered in normal use. Trays ink-printed with conventional inks discolored under temperature conditions encountered in normal use. Trays ink-printed according to the present invention were more visually appealing than standard polyethylene terephthalate sealed trays even after heating at temperatures above those encountered in normal use.

It is to be understood that while the present invention has been described by reference to preferred embodiments, variations and equivalents thereof may suggest themselves to those skilled in the art without departing from the spirit and scope of the invention as described by the claims appended hereto.

What is claimed is:

1. a method for making an ink-printed ovenable food container which comprises:
   (a) printing a layer of paperboard with an ink containing a sulfonated polyester pigment binder,
   (b) coating the resultant ink-printed paperboard with an unpigmented composition containing a sulfonated polyester,
   (c) coating the resultant ink-printed and sulfonated polyester coated paperboard with a polyester resin sealing coating, and
   (d) forming the resultant polyester resin sealed paperboard into a container.

2. A method according to claim 1 wherein the paperboard is coated with a composition containing a sulfonated polyester prior to printing.

3. A method according to claim 2 wherein the said composition also contains a pigment.

4. A method according to claim 1 wherein the ink-coated paperboard is coated with the unpigmented composition containing a sulfonated polyester while the ink coating is partially dry.

5. A method according to claim 2 wherein the paperboard coated with a composition containing sulfonated polyester is ink-printed while the previous coating is partially dry.

6. A method according to claim 1 wherein the sulfonated polyester is applied as an aqueous dispersion.

7. A method according to claim 2 wherein the sulfonated polyester is applied as an aqeuous dispersion.

8. A method according to claim 6 wherein the same sulfonated polyester is used in each aqueous dispersion.

9. A method according to claim 7 wherein the same sulfonated polyester is used in each aqeuous dispersion.

10. A method according to claim 8 wherein the sulfonated polyester is sulfonated polyethylene terephthalate.

11. A method according to claim 9 wherein the sulfonated polyester is sulfonated polyethylene terephthalate.

12. A method for making ink-printed paperboard which comprises
   (a) printing a layer of paperboard with an ink containing a sulfonated polyester pigment binder,
   (b) coating the resultant ink-printed paperboard with an unpigmented composition containing a sulfonated polyester, and
   (c) coating the resultant ink-printed and sulfonated polyester coated paperboard with a polyester resin sealing coating.

13. A method according to claim 12 wherein the paperboard is coated with a composition containing a sulfonated polyester prior to printing.

14. A method according to claim 13 wherein the said composition also contains a pigment.

15. A method according to claim 12 wherein the ink-coated paperboard is coated with the unpigmented composition containing a sulfonated polyester while the ink coating is partially dry.

16. A method according to claim 13 wherein the paperboard coated with a composition containing sulfonated polyester is ink-printed while the previous coating is partially dry.

17. A method according to claim 12 wherein the sulfonated polyester is applied as an aqueous dispersion.

18. A method according to claim 13 wherein the sulfonated polyester is applied as an aqueous dispersion.

19. A method according to claim 17 wherein the same sulfonated polyester is used in each aqueous dispersion.

20. A method according to claim 18 wherein the same sulfonated polyester is used in each aqueous dispersion.

21. A method according to claim 19 wherein the sulfonated polyester is sulfonated polyethylene terephthalate.

22. A method according to claim 20 wherein the sulfonated polyester is sulfonated polyethylene terephthalate.

23. An ink-printed ovenable food container made by
(a) printing a layer of paperboard with an ink containing a sulfonated polyester pigment binder,
(b) coating the resultant ink-printed paperboard with an unpigmented composition containing a sulfonated polyester,
(c) coating the resultant ink-printed and sulfonated polyester coated paperboard with a polyester resin sealing coating, and
(d) forming the resultant polyester resin sealed paperboard into a container.

24. An ink-printed ovenable food container according to claim 23 wherein the paperboard is coated with a composition containing a sulfonated polyester prior to printing.

25. An ink-printed ovenable food container according to claim 24 where the said composition also contains a pigment.

26. An ink-printed ovenable food container according to claim 23 wherein the polyester sealing resin is polyethylene terephthalate.

27. Ink-printed paperboard made by
(a) printing a layer of paperboard with an ink containing a sulfonated polyester pigment binder,
(b) coating the resultant ink-printed paperboard with an unpigmented composition containing a sulfonated polyester and
(c) coating the resultant ink-printed and sulfonated polyester coated paperboard with a polyester resin sealing coating.

28. An ink-printed paperboard according to claim 27 wherein the paperboard is coated with a composition containing a sulfonated polyester prior to printing.

29. An ink-printed according to claim 28 where the said composition also contains a pigment.

30. An ink-printed paperboard according to claim 27 wherein the polyester sealing resin is polyethylene terephthalate.

* * * * *